United States Patent [19]
Smith

[11] Patent Number: 5,728,758
[45] Date of Patent: Mar. 17, 1998

[54] COATING COMPOSITION AND ARTICLES HAVING A CURED COATING

[75] Inventor: Robert A. Smith, Murrysville, Pa.

[73] Assignee: Transitions Optical, Inc., Pinellas Park, Fla.

[21] Appl. No.: 635,077

[22] Filed: Apr. 19, 1996

Related U.S. Application Data

[63] Continuation-in-part of Ser. No. 166,053, Dec. 13, 1993, abandoned.

[51] Int. Cl.$^6$ .............................. C08L 29/04; C08L 43/04
[52] U.S. Cl. .............................. 524/265; 524/261; 525/61; 525/103
[58] Field of Search ...................... 524/265, 261, 524/503; 525/61, 103

[56] References Cited

U.S. PATENT DOCUMENTS

| | | | |
|---|---|---|---|
| 2,404,426 | 7/1946 | Bechtold et al. | 428/451 |
| 3,652,379 | 3/1972 | White et al. | 428/412 |
| 3,971,872 | 7/1976 | LeBoeuf | 428/412 |
| 3,986,997 | 10/1976 | Clark | 524/300 |
| 3,998,991 | 12/1976 | Kaas | 428/447 |
| 4,120,992 | 10/1978 | Laurin et al. | 427/164 |
| 4,127,697 | 11/1978 | Laurin | 428/412 |
| 4,164,602 | 8/1979 | Fabel | 428/334 |
| 4,172,187 | 10/1979 | Fabel | 525/61 |
| 4,423,131 | 12/1983 | Limburg et al. | 430/59 |
| 4,741,992 | 5/1988 | Przezdzieck | 430/523 |
| 4,904,525 | 2/1990 | Taniguchi et al. | 428/328 |
| 5,037,871 | 8/1991 | Jones | 524/261 |
| 5,115,023 | 5/1992 | Basil et al. | 525/103 |

FOREIGN PATENT DOCUMENTS

| | | |
|---|---|---|
| 62 212490 | 9/1982 | Japan . |
| 03-21675 | 1/1991 | Japan . |
| 04-345841 | 4/1992 | Japan . |

OTHER PUBLICATIONS

C.J.T. Landry et al, "In Situ polymerization of tetraethoxysilane in polymers: chemical nature of the interactions", Polymer (1992), vol. 33, No. 7, pp. 1496 To 1506.

M. Toki et al, "Structure of poly(vinylpyrrolidone) –silica hybrid", Polymer Bulletin (1992) 29, pp. 653–660.

T. Saegusa, "Organic Polymer–Silica Gel Hybrid: A Precursor of Highly Porous Silica Gel", J. Macromol. Sci –Chem., (1991) A28 (9), pp. 817–829.

M. E. Ellsworth et al, "Mutually Interpenetrating Inorganic–Organic Networks. New Routes into Nonshrinking Sol–Gel Composite Materials", J. Am. Chem. Soc. 1991, 113, pp. 2756–2758.

B. M. Novak et al, "Inverse Organic–Inorganic Composite Materials. Free Radical Routes into Nonshrinking Sol–Gel Composites", ACS Polymer Preprints, vol. 32, No. 3, 1991, pp. 512–513.

Primary Examiner—Vasu Jagannathan
Assistant Examiner—John J. Guarriello
Attorney, Agent, or Firm—Frank F. Mallak; Irwin M. Stein

[57] ABSTRACT

Describes a coating composition for the preparation of abrasion resistant coatings consisting essentially of:

(a) 5 to 35 weight percent of a silane monomer mixture of (i) $C_1$–$C_{12}$ alkyl tri($C_1$–$C_6$)alkoxysilane and (ii) tetra ($C_1$–$C_6$)alkoxysilane, the weight ratio of (i) to (ii) being from 3:1 to 1:3;

(b) 1 to 9 weight percent of polyvinyl alcohol that is at least 72 percent hydrolyzed;

(c) a solvating amount of lower aliphatic alcohol;

(d) a catalytic amount of water-soluble acid;

(e) a leveling amount of nonionic surfactant; and (f) water in an amount sufficient to form hydrolysates of the silane monomers and to solubilize the polyvinyl alcohol and acid. Further described are transparent articles and photochromic articles comprising organic polymeric host material, organic photochromic compound(s), and a cured abrasion resistant coating prepared from the coating composition.

14 Claims, No Drawings

5,728,758

COATING COMPOSITION AND ARTICLES HAVING A CURED COATING

CROSS REFERENCES TO RELATED APPLICATIONS

This application is a continuation-in-part of application Ser. No. 08/166,053, now abandoned filed Dec. 13, 1993.

DESCRIPTION OF THE INVENTION

The present invention relates to a coating composition for abrasion resistant coatings, and more particularly, relates to a coating composition consisting essentially of a mixture of organoalkoxysilane and organooxysilane monomers, polyvinyl alcohol, nonionic surfactant(s), lower aliphatic alcohol solvent, water-soluble acid and water. Still more particularly, this invention relates to articles such as optical elements, e.g., ophthalmic lenses, transparent sheets, films and photochromic articles, such as photochromic optical elements, transparent sheets and films having on at least one surface thereof a cured coating of the coating composition of the present invention. The coating on such articles, which articles are commonly prepared from organic polymeric host materials, demonstrates abrasion resistance, improved adhesion to the surface to which it is applied and resistance to chemical attack. The coating also enhances the light fatigue resistance of the photochromic compound(s) used to prepare photochromic articles.

Organic polymeric host materials that are typically used to make optical elements, transparent sheets and films have surfaces that are susceptible to abrasion and chemical attack. Often, such articles are coated with a protective coating to improve their abrasion resistance.

Abrasion resistant coatings that incorporate polyvinyl alcohol or hydrolyzed polyvinyl acetate and polysilicic acid ester, hydrolyzed polysilicic acid ester or hydrolyzed metal lower alkoxide have been described in U.S. Pat. Nos. 2,404,426; 3,652,379; 3,971,872; 3,998,991; 4,120,992; 4,423,131 and 5,037,871. Abrasion resistant coatings incorporating hydrolyzed polysilicic acid ester and polyvinyl acetals having a hydroxyl group content of 35 to 50 weight percent, calculated as polyvinyl alcohol, are described in U.S. Pat. Nos. 4,164,602 and 4,172,187. The use of polyvinyl pyrrolidone with organoalkoxysilane to form siloxane organic hybrid polymers is described in U.S. Pat. No. 5,115,023. Other abrasion resistant coatings formed from a partial condensate of a silanol or an organic silicon compound (or its hydrolysate) and particulate matter such as colloidal silica or micron-sized diamonds are described in U.S. Pat. No. 3,986,997 and Japanese Patent Application 3-21678, respectively.

U.S. Pat. No. 4,127,697 describes improving the adhesion to a lens of the abrasion resistant coating described in U.S. Pat. No. 3,986,997 by treating the lens with a tie-coat comprising an A-alkylenealkoxysilane, wherein A contains a group reactive with the substrate, prior to applying the abrasion resistant coating. Japanese Patent Application 62-212490 describes a coating comprising composites made of methyltrimethoxysilane and other organic silicones, which coating is for controlling the rate of discoloration of organic photochromic viologen compounds incorporated into a soluble resin, such as polyvinyl alcohol, which is then coated onto a synthetic resin.

Photochromism is a reversible phenomenon exhibited by a compound which, when exposed to light radiation involving ultraviolet rays, such as the ultraviolet radiation in sunlight or in the light of a mercury lamp, changes color and then returns to its original color if the ultraviolet radiation is discontinued or the compound is stored in the dark. Various classes of photochromic compounds have been synthesized and suggested for use in applications in which a sunlight-induced reversible color change or darkening is desired. For example, spiro(indoline) pyridobenzoxazine photochromic compounds are described in U.S. Pat. No. 4,637,698. Spiro (indoline) naphthoxazines are described in U.S. Pat. Nos. 3,562,172; 3,578,602; 4,215,010; and 4,342,668. Benzopyrans and naphthopyrans having a nitrogen-containing substituent at the 2-position of the pyran ring are described in U.S. Pat. No. 4,818,096. All of the aforedescribed oxazine- and pyran-type organic photochromic compounds are reported to exhibit a color change of from colorless to purple/blue on exposure to a source of ultraviolet (UV) light, e.g., sunlight.

Other organic photochromic compounds are reported to exhibit a color change of from colorless to yellow/orange when exposed to a source of UV light. Examples of such organic photochromic compounds are benzopyrans and naphthopyrans having a spiro adamantane group at the 2-position of the pyran ring. These spiropyrans are described in U.S. Pat. No. 4,826,977. Other yellow/orange coloring organic photochromic compounds include the naphthopyran compounds described in U.S. Pat. No. 5,066,818. These compounds contain at least one ortho-substituted phenyl substituent at the 3-position of the pyran ring, preferably a monoortho-substituted phenyl substituent.

A drawback to the widespread commercial use of organic photochromic compounds is the loss of their ability to change color as a result of prolonged repeated exposure to UV light, i.e., the organic photochromic compounds lose their photochromism; namely, their ability to change color. This loss of photochromic behavior is believed to be a result of irreversible decomposition of the organic photochromic compound and is referred to as fatigue or light fatigue.

It has now been discovered that incorporating a mixture of organooxysilane monomers, e.g., a mixture of tetraalkoxysilanes and trialkoxysilanes in certain proportions, in a coating composition containing polyvinyl alcohol, nonionic surfactant(s), lower aliphatic alcohol solvent, water-soluble acid and water provides a coating composition, which when cured on the surface of an organic polymeric host material, results in a coating that confers resistance to abrasion and chemical attack to that host material surface, and also has improved adhesion to the host material surface, as compared for example to the coating described in U.S. Pat. No. 3,971,872. When the coating composition of the present invention is applied to and cured on the surface of photochromic articles, there is provided the additional benefit of improved fatigue resistance of the organic photochromic substances used to achieve the photochromic effect. Such photochromic substances generally have absorption maxima within the visible range of between about 400 and about 700 nanometers.

The aforedescribed benefits may be achieved with a single-layer coating prepared from a coating composition that does not require a tie-coat and is substantially free of particulates such as colloidal silica and micron-sized diamonds, fluorosurfactants, such as a fluoroalkyl polyether, and trialkoxysilanes having an epoxy functionality.

DETAILED DESCRIPTION OF THE INVENTION

The use of polyvinyl alcohol (or hydrolyzed polyvinyl acetate) in combination with certain hydrolyzed polysilicic acid esters or hydrolyzed metal lower alkoxide in protective coating compositions has been described. Specifically, U.S. Pat. No. 3,998,991 describes a coating composition that includes a trialkoxysilane having epoxy functionality in combination with a tetraalkoxysilane; and U.S. Pat. Nos. 3,971,872 and 4,120,992 claim a polysilicic acid ester of an alcohol containing from 1 to 12 carbon atoms, said ester having up to four silicic acid groups per silicon atom. The '992 patent includes a cross-linking agent, such as formaldehyde or zirconyl nitrate in the formulation. U.S. Pat. No. 4,423,131 describes an improved photoresponsive device containing as a protectant overcoating a top layer of a crosslinked polyvinylsilicate resulting from the reaction of polysilicic acid with a polyvinyl alcohol having a number average molecular weight of from 10,000 to about 100,000. It is reported in general terms that the polysilicic acid component of the overcoating can be altered by the hydrolysis of trialkoxysilanes or the cohydrolysis of trialkoxysilane and tetraalkoxysilane. U.S. Pat. No. 5,037,873 describes a protective overcoat composition and photographic elements containing same comprising (a) a water-soluble hydroxylated polymer, (b) hydrolyzed metal lower alkoxide, or mixtures of such alkoxides, and (c) a fluoroalkyl polyether surfactant.

The coating formulation of the present invention is substantially free of epoxy functional trialkoxysilanes, formaldehyde and zirconyl nitrate cross-linking agents, fluoroalkyl polyether surface active agent and particulates, such as colloidal silica and micron-sized diamonds.

The coating formulation of the present invention is characterized by a specific ratio of trialkoxysilanes to tetraalkoxysilanes; and polyvinyl alcohol that is at least 72 percent hydrolyzed; namely, at least 72% hydrolyzed poly(vinyl acetate), for use on optical elements and at least 90 percent, preferably at least 95 percent, hydrolyzed for use on photochromic optical elements.

Other than in the operating examples, or when otherwise indicated, all values, such as those expressing wavelengths, quantities of ingredients, ranges or reaction conditions, used in this description and the accompanying claims are to be understood as modified in all instances by the term "about".

The aqueous coating composition of the present invention contains from about 5 to about 35 weight percent, preferably 5 to 25 weight percent, of a silane monomer mixture (and hydrolysates thereof) comprising (i) a first silane monomer that is a $C_1$–$C_{12}$ alkyl tri($C_1$–$C_6$) alkoxysilane, preferably a $C_1$–$C_4$ alkyl tri($C_1$–$C_3$) alkoxysilane, and (ii) a second silane monomer that is a tetra($C_1$–$C_6$) alkoxysilane, preferably a tetra($C_1$–$C_4$) alkoxysilane. The weight ratio in the silane monomer mixture of the first silane monomer to the second silane monomer may vary from about 3:1 to 1:3, preferably from about 2:1 to 1:3, and more preferably from about 1:1 to 1:3.

Suitable silane monomers that may be used as the first silane monomer include methyltriethoxysilane, ethyltrimethoxysilane, ethyltriethoxysilane, propyltrimethoxysilane, propyltriethoxysilane, hydrolysates thereof and mixtures of such silane monomers. Preferred as the first silane monomers are propyltrimethoxy silane and methyltriethoxysilane, more preferably methyltriethoxysilane.

Suitable silane monomers that may be used as the second silane monomer include tetramethoxysilane, tetraethoxysilane, tetra-n-propoxysilane, tetra-n-butoxysilane, hydrolysates thereof and mixtures of such silane monomers. Preferably, tetraethoxysilane is used as the second silane monomer.

Polyvinyl alcohol (PVA) is present in the coating composition at a level of from about 1 to about 9 weight percent. Suitable polyvinyl alcohols range in number average molecular weight from 2,000 to 150,000, preferably from 2,000 to 50,000, and are at least 72 percent hydrolyzed, preferably 87 percent hydrolyzed. Preferably, the PVA is present at a level of from 1 to 6 weight percent. For photochromic articles, the PVA is at least 90 percent, preferably 93 percent hydrolyzed and most preferably, is at least 98 percent hydrolyzed. Polyvinyl alcohol is commonly prepared by the hydrolysis of poly(vinyl acetate). The product is commonly reported as poly(vinyl alcohol), ___% hydrolyzed, although more precisely the percent hydrolysis refers to the degree of hydrolysis of the poly(vinyl acetate).

A leveling amount of nonionic surfactant(s) is also present as a component in the coating composition. A leveling amount is that amount which is sufficient to spread evenly or level the coating composition on the surface of the synthetic polymeric host material to which it is applied. Typically, the nonionic surfactant is used in amounts from 0.1 to 1.0 weight percent, based on the amount of the silane monomer mixture. Suitable non-ionic surfactants are described in the Kirk Othmer Encyclopedia of Chemical Technology, 3rd Edition, Vol.22, p.360 to p.377, the disclosure of which is incorporated herein by reference.

More particularly, the nonionic surfactant may be surfactants selected from the group consisting of ethoxylates of primary, secondary and branched paraffinic alcohols wherein the alcohol contains from about 6 to 20 carbon atoms and the average number of ethoxy groups are from 1 to 20; alkyl phenol ethoxylates and dialkyl phenol ethoxylates wherein each of the alkyl substituents contains from about 6 to about 12 carbon atoms and the average number of ethoxy groups are from 1 to 24; benzyl, propyleneoxy, butyleneoxy, phenoxy and $C_1$–$C_4$ alkoxy capped alkyl phenol ethoxylates, wherein the average number of propylene or butyleneoxy groups is from 1 to 5; glycerol esters of fatty acids containing from 6 to 24 carbon atoms; ethoxylates and propoxylates of fatty acids wherein the fatty acids contain from 6 to 24 carbon atoms and the average number of ethoxy or propoxy groups is from 1 to 24; sorbitan fatty acid esters wherein the fatty acids contain from 6 to 24 carbon atoms and ethoxylated sorbitan fatty acids esters wherein the average number of ethoxy groups is from about 3 to 20; fatty acid alkanolamides, such as fatty acid diethanoloamides, where the fatty acid contains from 6 to 24 carbon atoms and the alkanolamide contains from 0 to 4 carbon atoms; amine ethoxylates such as tertiary amine ethoxylates, e.g., RN(R') R", wherein R is a group containing from about 6 to 24 carbon atoms such as the residue of a fatty acid and R' and R" are ethoxy or polyethoxy groups having an average of 1 to 6 ethoxy groups; block copolymers of ethylene oxide and propylene oxide, e.g., ethoxylated polyoxypropylene glycols and propoxylated polyoxyethylene glycols; acetylenic diols and ethoxylated acetylenic diols; and capped nonionics represented by the formula $R(OCH_2CH_2)_nR'$ wherein R is $C_6$ to $C_{20}$ linear or branched alkyl, R' is selected from halogen, e.g., chloro, benzyl, phenoxy, $C_1$ to $C_4$ alkoxy or —$O(C_mH_{2m}O)_pH$ wherein m is 3 or 4 and p is 1 to 5; and n denotes the average number of ethylene oxide units and is a whole or fractional number ranging from 3 to 20.

Advantageously, the nonionic surfactant is an ethoxylated alkyl phenol such as the IGEPAL® DM surfactants or octylphenoxypolyethoxyethanol (available as TRITON® X-100), an acetylenic diol such as 2,4,7,9-tetramethyl-5-decyne-4,7-diol (available as SURFYNOL 104),ethoxylated acetylenic diols, such as the SURFYNOL 400 series, capped nonionics such as the benzyl capped octyl phenol ethoxylates (available as TRITON® CF87) and the propylene oxide capped alkyl ethoxylates, which are available as the PLURAFAC® RA series of surfactants, and octylphenoxyhexadecylethoxy benzyl ether.

A solvating amount of a lower aliphatic alcohol solvent is also present as a component in the coating composition. The lower aliphatic alcohol solvent, as used herein and in the claims, may be represented by the formula $[(R^2)_g R^3]_h (C_1-C_3)OH$, wherein $R^2$ and $R^3$ are each $C_1-C_2$ alkoxy and g and h are each the integers 0 or 1. Preferably, the solvent is a $C_1-C_3$ alkanol or an aliphatic alcohol of the formula $[(R^2)_g R^3]_h (C_1-C_3)OH$ wherein h is 1, and g is 0 or 1. A solvating amount is that amount which is sufficient to solubilize the silane monomers. The solvating amount may represent up to about 50 weight percent of the coating composition. When the solvating amount is greater than 40 weight percent of the coating composition, the composition is particularly suited for use with vision correcting ophthalmic lenses, such as bifocal lenses because it provides uniform distribution and minimal buildup of the coating on the edges on such lenses. Examples of suitable solvents include methanol, ethanol, propanol, 2-ethoxyethanol, 2-(2-methoxyethoxy) ethanol, 2-methoxyethanol, 2-(2-ethoxymethoxy) ethanol, 1-propanol, 2-propanol, and 1-methoxy-2-propanol.

The coating composition also contains a catalytic amount of a water-soluble acid, e.g., as an aqueous acidic solution. A catalytic amount is that amount which is sufficient to result in the polycondensation of the silane monomers and subsequent cross linking with the polyvinyl alcohol. The aqueous acidic solution may be prepared with an organic carboxylic acid or inorganic acid selected from the group consisting of acetic, formic, glutaric, maleic, nitric, hydrochloric, phosphoric, hydrofluoric, and sulfuric acids. Preferably, the acidic solution is hydrochloric acid. Water is also present in an amount sufficient to solubilize the polyvinyl alcohol component and the catalytic amount of aqueous acidic solution and to form hydrolysates of the silane monomer components. The sum of all of the components of the coating composition total 100 weight percent.

Photochromic compounds that may be utilized to prepare photochromic articles of the present invention, such as those heretofore described, are organic photochromic compounds or substances containing same that may be incorporated, e.g., dissolved or dispersed, in the organic polymeric host material used to prepare the photochromic articles. A first group of organic photochromic substances contemplated for use to form the photochromic articles of the present invention are those having an activated absorption maximum within the visible range of greater than 590 nanometers, e.g., between about greater than 590 to 700 nanometers. These materials typically exhibit a blue, blueish-green, or blueish-purple color when exposed to ultraviolet light in an appropriate solvent or matrix. Many of such compounds are described in the open literature. For example, spiro(indoline) naphthoxazines have been described, among others, in U.S. Pat. Nos. 3,562,172; 3,578,602; 4,215,010; and 4,342,668. Spiro(indoline)naphthoxazines having certain substituents at the 8' and 9' positions of the naphthoxazine portion of the molecule are described in U.S. Pat. No. 5,405,958. Spiro (indoline)pyridobenzoxazines are described in U.S. Pat. No. 4,637,698. Spiro(benzindoline)pyridobenzoxazines and spiro(benzindoline)naphthoxazines are described in U.S. Pat. No. 4,931,219. Spiro(benzindoline)naphthopyrans are described in Japanese Patent Publication 62/195383. Spiro (indoline)benzoxazines are described in U.S. Pat. No. 4,816, 584. Spiro(indoline)benzopyrans, spiro(indoline) naphthopyrans and spiro(indoline)quinopyrans are described, for example, in U.S. Pat. No. 4,880,667. Benzopyrans and naphthopyrans having a nitrogen-containing substituent at the 2-position of the pyran ring are described in U.S. Pat. No. 4,818,096. Spiro(indoline)pyrans are also described in the text, *Techniques in Chemistry*, Volume III, "Photochromism," Chapter 3, Glenn H. Brown, Editor, John Wiley and Sons, Inc., New York, 1971.

A second group of organic photochromic substances contemplated for use to form the photochromic articles of the present invention are those having at least one absorption maximum and preferably two absorption maxima, within the visible range of between about 400 and less than 500 nanometers. These materials typically exhibit a yellow-orange color when exposed to ultraviolet light in an appropriate solvent or matrix. Such compounds include certain chromenes, i.e., benzopyrans and naphthopyrans. Many of such chromenes are described in the open literature, e.g., U.S. Pat. Nos. 3,567,605; 4,826,977; and 5,066,818. Examples of benzopyrans and naphthopyrans having a spiro adamantane group attached to the pyran ring are described in U.S. Pat. No. 4,826,977. Naphthopyrans, i.e., [3H-2,1-b naphthopyrans], having at least one ortho-substituted phenyl substituent at the 3-position of the pyran ring are described in U.S. Pat. No. 5,066,818. Naphthopyran compounds having certain substituents at the number 8 carbon atom and certain substituents at the number 7 or 9 carbon atom, all substituents being on the naphtho portion of the naphthopyran, are described in U.S. Pat. No. 5,466,398. Naphthopyrans substituted on the pyran ring with (i) an aryl substituent and (ii) a phenyl substituent having a 5- or 6-member heterocyclic ring fused at the number 3 and 4 carbon atoms of the phenyl substituent are described in U.S. Pat. No. 5,384,077. Naphthopyran compounds substituted at the number 8 carbon atom on the naphtho portion of the naphthopyran ring, with for example a methoxy group, are the subject of U.S. Pat. No. 5,238,931. Naphthopyran compounds, examples of which are 3-aryl-3-arylalkenyl naphthopyrans, are described in U.S. Pat. No. 5,274,132.

A third group of organic photochromic substances contemplated for use to form the photochromic articles of the present invention are those having an absorption maximum within the visible range of between about 400 to about 500 nanometers and another absorption maximum within the visible range of between about 500 to about 700 nanometers. These materials typically exhibit color(s) ranging from yellow/brown to purple/gray when exposed to ultraviolet light in an appropriate solvent or matrix. Examples of these substances include certain benzopyran compounds, having substituents at the 2-position of the pyran ring and a substituted or unsubstituted heterocyclic ring, such as a benzothieno or benzofurano ring fused to the benz portion of the benzopyran. Such materials are the subject of co-pending U.S. patent application Ser. No. 08/220,344 filed Mar. 30, 1994. U.S. Pat. No. 5,429,774.

The disclosures of such photochromic compounds in the aforedescribed patents and patent applications are incorporated herein, in toto, by reference. The photochromic articles of the present invention may contain one photochromic compound or a mixture of photochromic compounds, as desired. Mixtures of photochromic compounds may be used to attain certain activated colors such as a near neutral gray or brown.

The organic photochromic substances of the second contemplated group described herein, i.e., those that color to yellow/orange may be combined with or used in conjunction with the first group of photochromic substances that color to purple/blue, e.g., the spirooxazine-type compounds, or both may be combined with or used in conjunction with the third group of described organic photochromic substances that color from yellow/brown to purple/gray. Each of the photochromic substances described herein may be used in amounts and in a ratio such that an organic host material to which the mixture of compounds is applied or in which they are incorporated exhibits a desired resultant color, e.g., a substantially neutral color such as shades of gray or brown when activated with unfiltered sunlight, i.e., as near a neutral color as possible given the colors of the activated photochromic compounds. The relative amounts of the aforesaid photochromic compounds used will vary and depend in part upon the relative intensities of the color of the activated species of such compounds, and the ultimate color desired. Generally, the weight ratio of the aforedescribed organic photochromic substance combination, i.e., (first to second), (first to third), and (second to third), will vary from about 1:3 to about 3:1, e.g., between about 0.75:1 and about 2:1. The combination of the first, second, and third organic photochromic substances may have a weight ratio that will vary from about 1:3:1 to 3:1:3.

The photochromic compositions of the present invention may be applied to or incorporated into a host material by various methods described in the art. Such methods include dissolving or dispersing the substance within the host material, e.g., imbibition of the photochromic substance into the host material by immersion of the host material in a hot solution of the photochromic substance or by thermal transfer; providing the photochromic substance as a separate layer between adjacent layers of the host material, e.g., as a part of a polymer film; and applying the photochromic substance as part of a coating placed on the surface of the host material. The term "imbibition" or "imbibe" is intended to mean and include permeation of the photochromic substance alone into the host material, solvent assisted transfer absorption of the photochromic substance into a porous polymer, vapor phase transfer, and other such transfer mechanisms.

The polymer host material will usually be transparent, but may be translucent or even opaque. The polymer product for photochromic articles need only be pervious to that portion of the electromagnetic spectrum, which activates the photochromic substance, i.e., that wavelength of ultraviolet (UV) light that produces the open form of the substance and that portion of the visible spectrum that includes the absorption maximum wavelength of the substance in its UV activated form, i.e., the open form. Further, the resin color should not be such that it masks the color of the activated form of the photochromic substance, i.e., so the change in color is readily apparent to the observer. Preferably, the host material article is a solid transparent or optically clear material, e.g., materials suitable for optical applications, such as plano and vision correcting ophthalmic lenses, windows, automotive transparencies, e.g., windshields, aircraft transparencies, plastic sheeting, polymeric films, etc.

Examples of host materials which may be used with the photochromic substances or compositions described herein include: polymers, i.e., homopolymers and copolymers, of polyol(allyl carbonate) monomers, polymers, i.e., homopolymers and copolymers, of polyfunctional acrylate monomers, polyacrylates, poly(alkylacrylates) such as poly(methyl methacrylate), cellulose acetate, cellulose triacetate, cellulose acetate propionate, cellulose acetate butyrate, poly(vinyl acetate), poly(vinyl alcohol), poly(vinyl chloride), poly(vinylidene chloride), polyurethanes, polycarbonates, polyesters, poly(ethylene terephthalate), polystyrene, copoly(styrene-methyl methacrylate), copoly(styrene-acrylonitrile), polyvinylbutyral and polymers, i.e., homopolymers and copolymers, of diallylidene pentaerythritol, particularly copolymers with polyol (allyl carbonate) monomers, e.g., diethylene glycol bis(allyl carbonate), and acrylate monomers.

Transparent copolymers and blends of transparent polymers are also suitable as host materials. Preferably, the host material is an optically clear polymerized organic material prepared from a polycarbonate resin, such as the carbonate-linked resin derived from bisphenol A and phosgene, which is sold under the trademark, LEXAN; a polyester, such as the material sold under the trademark, MYLAR; a poly(methyl methacrylate), such as the material sold under the trademark, PLEXIGLAS; polymerizates of a polyol(allyl carbonate) monomer, especially diethylene glycol bis(allyl carbonate), which monomer is sold under the trademark CR-39, and polymerizates of copolymers of a polyol (allyl carbonate), e.g., diethylene glycol bis(allyl carbonate), with other copolymerizable monomeric materials, such as copolymers with vinyl acetate, e.g., copolymers of from 80–90 percent diethylene glycol bis(allyl carbonate) and 10–20 percent vinyl acetate, particularly 80–85 percent of the bis(allyl carbonate) and 15–20 percent vinyl acetate, and copolymers with a polyurethane having terminal diacrylate functionality, as described in U.S. Pat. Nos. 4,360,653 and 4,994,208; and copolymers with aliphatic urethanes, the terminal portion of which contain allyl or acrylyl functional groups as described in U.S. Pat. No. 5,200,485; cellulose acetate, cellulose propionate, cellulose butyrate, cellulose acetate butyrate, polystyrene and copolymers of styrene with methyl methacrylate, vinyl acetate and acrylonitrile.

The amount of photochromic substance or composition containing same applied to or incorporated into a host material is not critical provided that a sufficient amount is used to produce a photochromic effect discernible to the naked eye upon activation. Generally such amount can be described as a photochromic amount. The particular amount used depends often upon the intensity of color desired upon irradiation thereof and upon the method used to incorporate or apply the photochromic substances. Typically, the more photochromic substance applied or incorporated, the greater is the color intensity. Generally, the amount of total photochromic substance incorporated into or applied to a photochromic optical host material may range from about 0.15 to about 0.35 milligrams per square centimeter of surface to which the photochromic substance(s) is incorporated or applied.

The coating composition of the present invention may be used in a coating process such as that described in U.S. Pat. No. 3,971,872, the disclosure of which is incorporated herein by reference. Preparation of the surface of the organic polymeric host material prior to coating is necessary for the purpose of cleaning the surface and promoting adhesion and water resistivity. Effective measures may include ultrasonic cleaning; washing with an aqueous mixture of solvent, e.g., isopropanol, activated gas treatment, i.e., treatment with ions, electrons, or excited gas, and chemical treatment such as hydroxylation of the surface with an aqueous solution of alkali, e.g., sodium hydroxide or potassium hydroxide. See column 3, lines 13 to 25 of U.S. Pat. No. 3,971,872, and column 6, lines 10 to 48 of U.S. Pat. No. 4,904,525, which disclosures are incorporated herein by reference.

At least one side of the organic polymeric host is coated with the coating composition of the present invention using any conventional coating method. The coated host material is then dried at ambient or at temperatures above ambient but below curing temperatures, e.g., up to about 80° C. Afterwards, the dried coated host material is heated to a temperature of between 90° C. to 125° C. for a period of about 1 to 3 hours in order to cure the abrasion resistant coating. While a range of temperatures has been provided for drying and curing the coated lens, it will be recognized by persons skilled in the art that other temperatures higher and lower than disclosed above may be used.

Conventional methods for coating the organic polymeric host material such as flow coating, dip coating, spin coating, roll coating, curtain coating, and spray coating may be used to apply the coating composition. Application of the coating is typically done in an environment that is substantially free of dust. Methods for curing the coating in addition to conventional radiant heat exposure, i.e., heating in an oven, may include irradiating with infrared, gamma, or electron radiation so as to promote the polymerization reaction of the reactive components.

The present invention is more particularly described in the following examples, which are intended as illustrative only, since numerous modifications and variations therein will be apparent to those skilled in the art.

EXAMPLE 1

Water (630 grams) was added to a reaction flask and heated until boiling. Thirty-five (35 grams) of polyvinyl alcohol, available as Product No. 9274, vinyl alcohol polymer (about 98% hydrolyzed—considered as fully hydrolyzed—about 7,000–10,000 number average molecular weight) from Monomer-Polymer Laboratories, was added to the reaction flask with stirring. Ethanol (392 grams) was slowly added to the reaction flask in order to prevent the rapid cooling of the reaction mixture. Subsequently, 2 grams of concentrated hydrochloric acid, 26.25 grams of methyltriethoxysilane, 78.75 grams of tetraethoxysilane and 0.5 gram of octylphenoxypolyethoxyethanol (TRITON® X-100) were added to the reaction flask with rapid stirring. The contents of the reaction flask were cooled to room temperature prior to use.

EXAMPLE 2

The procedure and amounts of ingredients in Example 1 were used except that about 78 percent hydrolyzed polyvinyl alcohol having an approximate number average molecular weight of 2000, 441 grams of water and 581 grams of ethanol were used.

EXAMPLE 3

The procedure and amounts of ingredients in Example 1 were used except that 92.75 grams of tetraethoxysilane and 12.25 grams of methyltriethoxysilane were used.

EXAMPLE 4

The procedure and amounts of ingredients in Example 1 were used except that about 88 percent hydrolyzed polyvinyl alcohol having an approximate number average molecular weight of 3,000; 441 grams of water; 581 grams of ethanol; and 4 grams of concentrated hydrochloric acid were used.

EXAMPLE 5

The procedure and amounts of ingredients in Example 1 were used except that about 88 percent hydrolyzed polyvinyl alcohol having an approximate number average molecular weight of 3,000; 441 grams of water; 581 grams of ethanol; 4 grams of concentrated hydrochloric acid; and 23.62 grams of methyltriethoxysilane were used.

EXAMPLE 6

The procedure and amounts of ingredients in Example 1 were used except that 105 grams of methyltriethoxysilane was used and the tetraethoxysilane reactant was omitted. The resulting product solidified and could not be used as a coating composition.

EXAMPLE 7

The procedure and amounts of ingredients in Example 4 were followed except that equal amounts (17.5 grams) of about 88 percent hydrolyzed polyvinyl alcohol and about 98 percent hydrolyzed polyvinyl alcohol were used. The mixture of polyvinyl alcohols provided a calculated average of about a 93 percent hydrolyzed polyvinyl alcohol.

COMPARATIVE EXAMPLE 1

The procedure and amounts of ingredients in Example 1 were used except that 105 grams of tetraethoxysilane was used and the methyltriethoxysilane reactant was omitted.

COMPARATIVE EXAMPLE 2

The procedure and amounts of ingredients in Example 1 were used except that 140 grams of tetraethoxysilane was used and the methyltriethoxysilane reactant was omitted.

EXAMPLE 8

Part A

Transitions® Plus lens blanks, a photochromic plastic lens blank reported to be prepared from a polymerizate of a polyol (allyl carbonate) composition, which are sold by Transition Optical Co., were rinsed with isopropanol, etched in 50% sodium hydroxide for 10 minutes at ambient room temperature, then rinsed with de-ionized water and finally rinsed with isopropanol before air drying. The coating solutions prepared in Examples 1, 3 and Comparative Example 1 were applied to test lens blanks by dip coating. The coating solution was "dropped" away from the suspended sample at a carefully controlled rate of 90 millimeters per minute. Coatings were air dried inside a clean hood until tack free (usually 10–20 minutes) and were then cured in a hot air oven for two and one half hours at the temperatures indicated in Table 1. The thickness of the coatings was about 1 to 2 microns.

The lenses to be coated with the Example 2 coating composition were bifocal Transition® Plus lens blanks. These lenses were etched in 12 weight percent aqueous sodium hydroxide for three minutes at 50° C., rinsed with a mixture of de-ionized water and isopropanol and air dried. The dry lenses were dip coated with the coating composition of Example 2. The coating solution was dropped away at a rate of 160 millimeters per minute, held at 56° C. until dry, and cured at 108° C. for 2.5 hours. The resulting coating had a thickness of 1.2 microns.

The coating solutions prepared in Examples 4 and 5 were applied to Transition® Plus lens blanks by spin-coating at 1,000 revolutions per minute. These lenses were prepared before coating using the same procedures used for the lenses coated with the coating solutions of Examples 1, 3 and Comparative Example 1. After drying at room temperature inside of a clean hood, the lenses were held at 56° C. for 20 minutes and then cured at 115° C. for two and one-half hours. The thickness of the coatings was about 1 to 2 microns.

The coated and cured lens blanks were scribed with a crosshatch pattern (grid) on the coating surface and immersed in boiling water for one hour to "age" the lens and simulate chemical attack. Adhesion testing was performed on the aged lenses by applying 3M Scotch Tape #600 to the grid on each lens and removing it. This was done three times and the percent coating loss was determined by a qualitative visual analysis. The results for lenses coated with the coating solutions of Examples 1, 2, 3 and Comparative Example 1 are reported in Table 1, and the results for the lenses coated with the coating solutions of Examples 4 and 5 are reported in Table 2.

Part B

Test square polymerizates prepared from a diethylene glycol (allyl carbonate) composition were rinsed before and after etching as done in Part A for lens blanks coated with the solutions prepared in Examples 1, 3 and Comparative Example 1. Each test square measured ⅛ inch (0.3 centimeter)×2 inch (5.1 centimeters)×2 inch (5.1 centimeters). The test squares were etched in the following manner: test squares to be coated with the solutions of Examples 1 and 2 were immersed for three minutes in 15 weight percent aqueous sodium hydroxide solution maintained at a temperature of 50° C.; test squares to be coated with the solution of Comparative Example 2 were immersed for ten minutes in a 50 weight percent aqueous sodium hydroxide solution maintained at room temperature. The coating solutions prepared in Examples 1, 2 and Comparative Example 2 were applied to the etched test squares by dip coating. The coating solution was "dropped" away from the suspended sample at a carefully controlled rate of 90 millimeters per minute.

Coatings were air dried inside a clean hood until tack free (usually 10–20 minutes). The test squares coated with the solution of Examples 1 and 2 were cured in a hot air oven for two and one half hours and the test squares coated with the solution of Comparative Example 2 were cured in a hot air oven for two hours. Curing temperatures are indicated in Table 3. The thickness of the coating on the test squares was approximately 1 micron, as determined by optical microscopy. Abrasion resistance of the coated test squares was determined using ASTM Standard Test Method F735-81. The coated and uncoated test squares were exposed to 600 cycles of oscillation in the ASTM test method. The Bayer Abrasion Resistance index (BARI), listed in Table 3 as duplicate results for each test square, was calculated by dividing the percent haze obtained with uncoated test squares made of homopolymers prepared from CR-39® monomer by the percent haze of the coated test sample. The resulting number is an indication of how much more abrasion resistant the coated test sample is as compared to uncoated test squares made of homopolymers prepared from CR-39® monomer. Haze measurements were performed before and after abrasion testing with a Hunter Lab Model D25P Colorimeter.

Part C

Photochromic dyes were incorporated into test square polymerizates prepared from a diethylene glycol bis(allyl carbonate) composition by an imbibition process. The test squares measured ⅛ inch (0.3 centimeter)×2 inch (5.1 centimeters)×2 inch (5.1 centimeters). A photochromic composition having a 50/32/18 weight ratio of 5-acetoxy-3-(2, 4-dimethoxy)phenyl-3-(4-methoxy) phenyl-3H-naphtho[2, 1-b]pyran/1,3-dihydro-3,3-dimethyl-5-methoxy-1-propyl spiro[2H-indole-2,3'-[3H]pyrido{3,2-f}(1,4)benzoxazine]/ 1,3-dihydro-1-propyl-3,3,5,6-tetramethylspiro[2H-indole-2, 3,'-[3H]pyrido{3,2-f}(1,4)benzoxazine] was dissolved in a 1:9 mixture of ethyl cellulose:toluene to form a 10 weight percent solution. The solution was then spin coated onto the test squares and allowed to air dry. Samples were then heated in a hot air oven at 135° C. for 90 minutes in order to thermally transfer the photochromic into the test squares. After cooling, the ethyl cellulose/toluene resin film was removed from the test squares by washing with acetone.

The photochromic test squares were rinsed before and after etching, as performed in Part A for lens blanks coated with the solution prepared in Example 1. The test squares were etched for three minutes in a 15 weight percent aqueous sodium hydroxide solution maintained at a temperature of 50° C. The coating solutions prepared in Examples 1, 2, 4 and 7 were applied to the test squares by dip coating. The coating solution was "dropped" away from the suspended sample at a carefully controlled rate of 90 millimeters per minute. The coated test squares were air dried inside a clean hood until tack free (usually 10–20 minutes) and were cured in a hot air oven for two and one-half hours at 125° C.

The coated and uncoated test squares were placed in a QUV Accelerated Weathering Tester, made by the Q Panel Co., Cleveland, Ohio, operated at 52° C., and were exposed to 351 nanometer ultraviolet light in the tester for selected time intervals. After each time interval, coated and uncoated test squares were removed and exposed to 365 nanometer ultraviolet light for about 15 minutes to activate the photochromic compounds and then placed into a 76° C. oven for about 15 minutes to bleach or inactivate the photochromic compounds. The test squares were then cooled to room temperature, exposed to fluorescent room lighting for at least 2 hours and then kept covered for at least 2 hours prior to testing on an optical bench maintained at 75° F. (23.9° C.).

The optical bench was mounted with a 150 watt Xenon arc lamp, a remote controlled shutter, a copper sulfate bath acting as a heat sink for the arc lamp, a Schott WG-320 nm cut off filter which removes short wavelength radiation neutral density filter(s) and a sample holder in which the square to be tested was inserted. A collimated beam of light from a tungsten lamp was passed through the square at a small angle normal to the square. After passing through the square, the light from the tungsten lamp was directed through a photopic filter attached to a detector. The photopic filter passes wavelengths such that the detector mimics the response of the human eye. The output signals from the detector(s) were processed by a radiometer.

Change in optical density ($\Delta OD$) was determined by inserting the photochromic test square in the bleached state into the sample holder adjusting the transmittance scale to 100%, opening the shutter from the Xenon lamp to provide ultraviolet radiation to activate the photochromic compounds from their bleached state to an activated (i.e., darkened) state, measuring the transmittance in the activated state, and calculating the change in optical density ($\Delta OD$) according to the formula $\Delta OD = \log(100/\% Ta)$, where % Ta is the percent transmittance in the activated state and log is the logarithm to the base 10. The period of exposure to ultraviolet light from the Xenon lamp at the time the percent transmittance is determined is one minute. The results listing percent optical density retained by the samples coated with Examples 1, 2, 4 and 7 and the uncoated sample are included in Table 4.

TABLE 1

Aged Adhesion Results for Test Coatings

| Cure Temperature | Percent Coating Loss | | | Comparative Example 1 |
|---|---|---|---|---|
| | Example 1 | Example 2 | Example 3 | |
| 105° C. | 0 | 0 | 4 | 100 |
| 115° C. | 0 | 0 | 42 | 100 |

TABLE 2

Aged Adhesion Results for Test Coatings

| Cure Temperature | Example 4 | Percent Coating Loss Example 5 |
|---|---|---|
| 115° C. | 0,0,0,0 | 0*,0*,100,100 |

*These lenses showed no loss of adhesion but were crazed, i.e., had cracks in the coating that were visible to the naked eye.

TABLE 3

Bayer Abrasion Resistance Index Results for Duplicate Test Samples

| Cure Temperature | Example 1 | Example 2 | Comparative Example 2 |
|---|---|---|---|
| 95° C. | 2.6, 2.1 | 1.1, 1.2 | 4.0, 5.4 |
| 105° C. | 3.4, 2.7 | 2.2, 2.2 | 8.7, 8.2 |
| 115° C. | 2.3, 4.3 | 2.4, 2.4 | 8.7, 9.2 |
| 125° C. | 2.3, 2.0 | 2.8, 2.3 | 15.0, 8.2 |

TABLE 4

Percent Optical Density Retained by Coated and Uncoated Photochromic Test Squares Measured at Selected Time Intervals

| | | Coated with Composition of | | | |
|---|---|---|---|---|---|
| Hours | Uncoated | Example 1 | Example 2 | Example 3 | Example 7 |
| 0 | 100 | 100 | 100 | 100 | 100 |
| 20 | 73 | 91 | 71 | 75 | 85* |
| 100 | 62 | 85 | 62 | 62 | 75 |
| 150 | 56 | 72 | 54 | 58 | 67 |
| 250 | 48 | 70 | 50 | 49 | 59 |

*50 hours

In Table 1, the results for the lenses coated with the coating solutions of Examples 1 and 2 show no loss of adhesion while the results for the lenses coated with the coating solutions of Example 3 and Comparative Example 1 show from 4 to 100 percent loss. Any loss of adhesion is unacceptable. The results in Table 2 show no loss of adhesion for all of the lenses coated with the coating solution of Example 4 and for half of the lenses coated with the coating solution of Example 5. However, adherent coatings prepared from the coating solution of Example 5 were crazed, i.e., the presence of visible cracks in the coating were observed. Crazing is an unacceptable characteristic of a coated lens and is also considered as a failure of the aged adhesion test. All of the tested lenses coated with the coating solution of Example 4 showed no visible signs of crazing.

The coating solutions of Examples 1, 2, and 4 contain a silane monomer mixture of (i) methyltriethoxysilane to (ii) tetraethoxysilane having a weight ratio of 1:3. The coating compositions of Examples 3 and 5 have a weight ratio of (i):(ii) of 1:7.6 and 1:3.3, respectively. The coating solutions of Comparative Examples 1 and 2 are substantially free of silane monomer (i). The coating solution of Example 6 is substantially free of silane monomer (ii) and resulted in a solid product that could not be used. The data of Tables 1 and 2 show unacceptable results when the weight ratio of the first silane monomer (i) to a second silane monomer (ii) is outside the range of 3:1 to 1:3.

The results in Table 3 for the test squares coated with the coating solutions of Examples 1 and 2 and cured at 105° C. or above revealed an improvement of abrasion resistance of 2 or more times that of test squares made of homopolymers prepared from CR-39® monomer. Of particular note is that these results were not significantly effected by increasing the cure temperature. This is a beneficial characteristic of the coating since curing ovens maintain a set temperature by adjusting to upper and lower internal temperatures. The BARI results for the coating solution of Comparative Example 2 reveal increases of abrasion resistance ranging from 4.0 to greater than 9.2 over the results for test squares made of homopolymer prepared from CR-39® monomer, which correspond generally to the increasing cure temperature. Bayer Abrasion Resistance Indices (higher than 4) result in a greater likelihood of crazing or cracks forming in the coating.

The results listed in Table 4 for the photochromic test squares demonstrate that the sample coated with the coating solution of Example 1 retains a higher percent optical density than the uncoated sample and the samples coated with the coating solutions of Example 2, 4 and 7 over the entire test period of 250 hours. These results indicate that a fully hydrolyzed PVA in the coating solution of Example 1 improved the light fatigue resistance of the photochromic test square. The coating solution of Examples 2 and 4 used polyvinyl alcohol of about 78 percent and 88 percent hydrolyzed PVA respectively, and were as ineffective as the uncoated sample in preventing light fatigue of the photochromic test squares. The coating solution of Example 7 used polyvinyl alcohol of about 93 percent hydrolyzed PVA, and provided 10 percent more light fatigue resistance, measured as percent Optical Density, than the lenses coated with the coating solutions of Examples 2 and 4.

The present invention has been described with reference to specific details of certain embodiments thereof. It is not intended that such details should be regarded as limitations upon the scope of the invention except insofar as they are included in the accompanying claims.

I claim:

1. An aqueous coating composition consisting essentially of:

(a) 5 to 35 weight percent of a silane monomer mixture of (i) $C_1$–$C_{12}$ alkyl tri($C_1$–$C_6$)alkoxysilane and (ii) tetra ($C_1$–$C_6$)alkoxysilane, the weight ratio of (i) to (ii) being from 3:1 to 1:3;

(b) 1 to 9 weight percent of polyvinyl alcohol that is at least 72 percent hydrolyzed;

(c) a solvating amount of lower aliphatic alcohol;

(d) a catalytic amount of water-soluble acid;

(e) a leveling amount of nonionic surfactant; and (f) water in an amount sufficient to form hydrolysates of said silane monomers and to solubilize said polyvinyl alcohol and water-soluble acid catalyst.

2. The aqueous coating composition of claim 1 wherein from 5 to 25 weight percent of the silane monomer mixture is used; the silane monomers are (i) $C_1$–$C_4$ alkyl tri($C_1$–$C_3$) alkoxysilane and (ii) tetra($C_1$–$C_4$) alkoxysilane; from 1 to 6 weight percent of polyvinyl alcohol is used; and the lower aliphatic alcohol is a $C_1$–$C_3$ alkanol.

3. The aqueous coating composition of claim 2 wherein the first silane monomer (i) is propyltrimethoxysilane or methyltriethoxysilane and the second silane monomer (ii) is tetraethoxysilane; the water-soluble acid is selected from the group consisting of acetic, glutaric, nitric, sulfuric, and hydrochloric acid; and the nonionic surfactant is selected from the group consisting of 2,4,7,9-tetramethyl-5-decyne-4,7-diol, octyl phenoxyhexadecylethoxy benzyl ether and octylphenoxypolyethoxyethanol.

4. The aqueous coating composition of claim 3 wherein the first silane monomer (i) is methyltriethoxysilane and the second silane monomer (ii) is tetraethoxysilane, the polyvinyl alcohol is at least 87 percent hydrolyzed; the lower aliphatic alcohol is ethanol; the water-soluble acid is nitric acid or glutaric acid; and the nonionic surfactant is octylphenoxypolyethoxyethanol.

5. The aqueous coating composition of claim 4 wherein said polyvinyl alcohol is at least 93 percent hydrolyzed.

6. The aqueous coating composition of claim 5 wherein said polyvinyl alcohol is at least 98 percent hydrolyzed.

7. The aqueous coating composition of claim 1 wherein said solvating amount of lower aliphatic alcohol comprises up to about 50 weight percent of the coating composition.

8. The aqueous coating composition of claim 1 wherein, the polyvinyl alcohol is present in an amount of from 1 to 6 weight percent; the lower aliphatic alcohol comprises up to 50 weight percent of the coating composition; the nonionic surfactant is present in an amount of from 0.1 to 1.0 weight percent, based on the amount of the silane monomer mixture; and the weight ratio of the silanes (i) to (ii) is from 2:1–1:3.

9. The aqueous coating composition of claim 8 wherein the polyvinyl alcohol has a number average molecular weight of from 2,000 to 50,000.

10. The aqueous coating composition of claim 8 wherein from 5 to 25 weight percent of the silane monomer mixture is used; the first silane monomer (i) is propyltrimethoxysilane or methyltriethoxysilane, and the second silane monomer (ii) is tetraethoxysilane; the water-soluble acid is hydrochloric acid; and the lower aliphatic alcohol is a $C_1$–$C_3$ alkanol.

11. The coating composition of claim 1 wherein the lower aliphatic alcohol is represented by the formula:

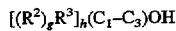

wherein $R^2$ and $R^3$ are each $C_1$–$C_2$ alkoxy, and g and h are each the integers 0 or 1, and the water-soluble acid is selected from the group consisting of acetic, glutaric, nitric, sulfuric and hydrochloric acid.

12. The coating composition of claim 11 wherein the lower aliphatic alcohol comprises up to 50 weight percent of the coating composition and the nonionic surfactant is present in an amount of from 0.1 to 1.0 weight percent, based on the amount of the silane monomer mixture.

13. The coating composition of claim 12 wherein the polyvinyl alcohol is at least 87 percent hydrolyzed.

14. The coating composition of claim 12 wherein the polyvinyl alcohol is at least 93 percent hydrolyzed.

* * * * *